INVENTORS
BILLY G. HURD
WILLIAM R. FOSTER

ATTORNEY

United States Patent Office 3,469,630
Patented Sept. 30, 1969

3,469,630
METHOD OF MINIMIZING ADSORPTION OF SURFACTANT FROM FLOODING WATER
Billy G. Hurd and William R. Foster, Dallas, Tex., assignors to Mobil Oil Corporation, a corporation of New York
Filed Oct. 9, 1967, Ser. No. 673,685
Int. Cl. E21b *43/20, 43/22*
U.S. Cl. 166—250                                    27 Claims

ABSTRACT OF THE DISCLOSURE

This specification discloses a method of waterflooding to recover oil from a subterranean formation. The method comprises injecting into the formation a solution of sacrificial inorganic additive in advance of a surfactant solution to minimize adsorption of the surfactant onto the surfaces of the subterranean formation. Preferably, the sacrificial inorganic additive is additionally injected concurrently with and behind the surfactant solution.

BACKGROUND OF THE INVENTION

This invention relates to the recovery of petroleum from a subterranean formation. More particularly, this invention relates to the recovery of petroleum contained in a subterranean formation by flooding the formation with water.

The petroleum, more commonly called crude oil or simply oil, accumulated in subterranean formations is recovered or produced therefrom through wells drilled into the subterranean formation. A large amount of the oil is left in the subterranean formation if produced only by primary depletion, i.e., where only initial formation energy is used to recover the oil. Where the initial formation energy is inadequate or has become depleted, supplemental operations are employed. These supplemental operations are often referred to as secondary recovery operations although in fact they may be primary or tertiary in sequence of their employment.

In a successful and widely used supplemental operation, a fluid is injected through injection means, comprising one or more injection wells, and passed into the formation. Oil is displaced within and is moved through the formation, and is produced from production means, comprising one or more production wells, as the injected fluid passes from the injection means toward the production means. In a particular recovery operation of this sort, water is employed as the injected fluid and the operation is referred to as a waterflood. The injected water is referred to as the flooding water, as distinguished from the in-situ, or connate, water.

Waterflooding is a useful method of supplementing recovery of oil from subterranean formations. It has, however, a relatively poor microscopic displacement efficiency. The microscopic displacement may be defined as the ratio of the amount of oil displaced from the pore space of the portion of the formation through which the water as passed to the original amount of oil therein. The relatively poor microscopic displacement is due to the property of immiscibility which the water, as the flooding liquid, has with the oil it seeks to displace. There is a relatively high interfacial tension between the water and the oil. The interface between the two liquids is an interfacial zone analogous to a film that, because of appreciable interfacial tension, is prevented from moving through the micropores, or smaller pores of the formation, to displace the oil therefrom. Regardless, there is a relationship between the microscopic displacement efficiency of a flooding water and the interfacial tension between the flooding water and the oil it seeks to displace, the displacement efficiency decreasing with increasing interfacial tension.

It has been suggested that surfactants be employed to lower the interfacial tension between the flooding water and the oil and thus increase the microscopic displacement of the oil by the flooding water. Employing surfactants is technically successful in that the surfactant solution increases recovery of oil from a subterranean formation. The adsorption of the surfactant on the surfaces of the pores of the subterranean formation is, however, so extensive as to render the use of surfactants uneconomical. Stated otherwise, the most of the surfactants adsorbed onto the subterranean formation is greater than the value of the additional oil recovered by employing the surfactants.

Summary of the invention

The invention provides a method of recovering oil from an oil-containing subterranean formation having injection means and production means completed therein which comprises: (a) injection through an injection well and into the subterranean formation an aqueous solution of sacrificial inorganic additive containing enough sacrificial inorganic additive to cover the majority of the adsorption sites of the subterranean formation, (b) injecting through an injection well and into the subterranean formation a surfactant solution, and (c) injecting through an injection well and into the subterranean formation flooding water. Oil is produced from the subterranean formation to the surface of the earth through a production well.

Description of specific embodiments

Figure 1:
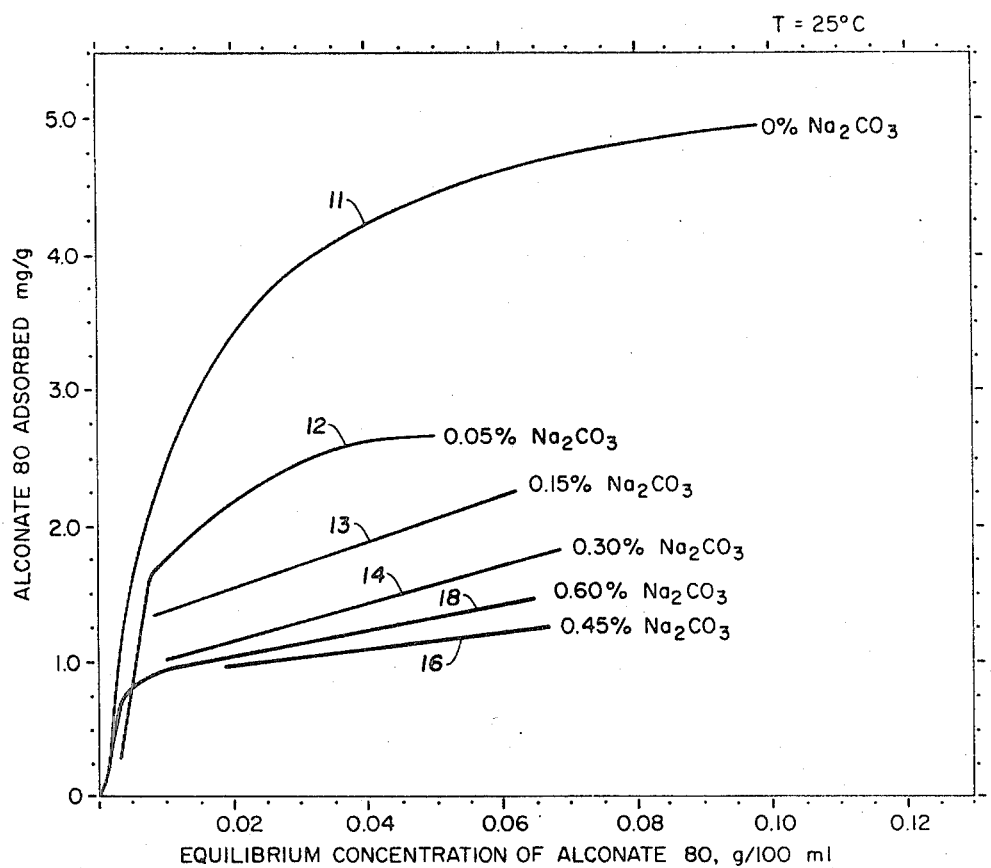
FIGURES 1, 1*a*, and 1*b* are graphs showing adsorption isotherms for surfactants in the presence of various sacrificial inorganic additives.

In carrying out the invention, an aqueous solution of sacrificial inorganic additive is injected through an injection well and into a substerranean formation to cover absorption sites within the subterreanean formation and reduce the absorption of the more expensive surfactant injected therebehind. The absorption sites are those parts of the surfaces of the pores of the formation capable of absorbing a chemical compound from a solution on contact therewith. The sacrificial inorganic additives do not effect recovery of any significant additional oil over flooding water alone. Recovery of the additional oil requires the injection of the surfactant solution. Accordingly, surfactant solution is injected into the subterranean formation to effect enhanced displacement of oil within the formation. Ordinarily, flooding water is injected through the injection means and into the subterranean formation behind the surfactant solution to move the displaced oil, solution of sacrificial inorganic additive, and surfactant solution within the subterranean formation toward a production well. Oil is produced through the production means to the surface of the earth.

The surfactant is introduced into the interfacial zone in the subterranean formation between the oil in the formation and the flooding water, achieving a low interfacial tension. The surfactant may be introduced into the interfacial zone in the subterranean formation from either a hydrocarbonaceous phase, an aqueous phase, or both. For example, the surfactant may be injected into the formation in solution in a hydrocarbonaceous liquid and will enter into the interfacial zone from the hydrocarbonaceous solution. On the other hand, the surfactant may be injected into the formation in aqueous solution and will enter the interfacial zone from the aqueous solution. The surfactant may be also injected into the formation in a hydrocarbonaceous solution and in aqueous solution, both the solutions being injected, respectively, into the subterranean formation. In this way, the surfactant enters the interfacial zone from both the hydrocarbonaceous solution and the aqueous solution. This latter method of introducing the surfactant produces particularly low interfacial tensions.

To appreciate better the present invention, it is necessary to understand the adsorption problem encountered in employing surfactants in a waterflooding operation in accordance with prior procedures. The surfactant solution injected into the formation has a high enough concentration of surfactant to improve the microscopic displacement of the oil. On the surfaces of the pores of the subterranean formations there are, however, the adsorption sites at which the surfactant is adsorbed onto the formation with resultant decrease in concentration of the surfactant in the surfactant solution. The adsorption is rapid onto those sites on the surface of the subterranean formations which have not been covered otherwise. The flooding water which follows can ultimately desorb the surfactant from the adsorption sites, but lowering of the concentration and dispersion of the surfactant components will have been effected. Thus, the beneficial effects of the surfactant solution will have been lost.

It has been suggested to employ a high concentration of surfactant in the initial surfactant slug and satisfy the adsorption site demands of the subterranean formation, yet retain a sufficient concentration to achieve the enhanced recovery of oil. Such high concentrations, however, are prohibitively expensive.

By this invention, to lessen the expense of employing large quantities of surfactant in the surfactant solution used in a waterflood, a sacrificial inorganic additive which is more economical than the surfactant and which will successfully compete with the surfactant for the adsorption sites on the subterranean formation is employed. In order to compete successfully, the sacrificial inorganic additive must adsorb sufficiently to cover adsorption sites and prevent loss of surfactant. The simplest sacrificial inorganic additive comprises a soluble carbonate or a wetting agent. Suitable soluble carbonates include the alkali metal carbonates. For all practical purposes, sodium carbonate is the soluble carbonate which will be employed. Illustrative wetting agents include the inorganic polyphosphates and borax. The inorganic polyphosphates are those polyphosphates which have high adsorption coefficients and adsorb strongly onto the sites of the subterranean formation. Typical are sodium tripolyphosphate, $Na_5P_3O_{10}$, and tetrasodium pyrophosphate, $Na_4P_2O_7$. The orthophosphates are not satisfactory. By borax is meant sodium borate, $Na_2B_4O_7 \cdot 10H_2O$.

In clean formations containing predominantly silicates, a soluble carbonate alone is a suitable sacrificial inorganic additive since it will cover essentially all of the adsorption sites. On the other hand, in dirty formations, i.e., formations containing appreciable quantities of clays, a soluble carbonate alone is not completely satisfactory as the sacrificial inorganic additive despite the fact that it will cover a large number of the adsorption sites of the formation. Such dirty formations require the presence of a wetting agent such as an inorganic polyphosphate to cover essentially all the adsorption sites. A wetting agent alone is a suitable sacrificial inorganic additive. Ordinarily, it is preferred to employ as the sacrificial inorganic additive both sodium carbonate and at least one of the wetting agents since more nearly complete coverage of the adsorption sites can be effected at a much lower cost in this way than by attempting to employ a single additive to cover the adsorption sites.

Regarding the surfactant, any surfactant which will reduce the interfacial tension between the water phase and the oil phase within the subterranean formation can be employed. Preferred surfactants are those that reduce the interfacial tension to less than about 0.1 dyne per centimeter. Illustrative of suitable surfactants are mixtures of alkyl aryl sulfonates. Particularly satisfactory surfactants are restricted mixtures of petroleum sulfonates having a median molecular weight of from about 375 to about 430, having molecular weights between 290 and 590, no more than 10 percent by weight thereof having an average molecular weight less than 290, and no more than 15 percent by weight thereof having an average molecular weight greater than 590. Hereinafter, these petroleum sulfonates are referred to by the term "the restricted petroleum sulfonates." Still more particularly satisfactory surfactants are the restricted petroleum sulfonates that have a median molecular weight of from about 400 to about 430 and otherwise have the molecular weight distribution of the restricted petroleum sulfonates outlined above. These particularly preferred petroleum sulfonates are referred to herein as "the preferred restricted petoleum sulfonates." The petroleum sulfonates may be natural petroleum sulfonates prepared from a crude oil or refinery stream or synthetic petroleum sulfonates prepared from alkyl aryl fractions synthesized in various chemical reactions.

The molecular weights referred to above and hereinafter are the molecular weights of the sodium salts of the petroleum sulfonates. Moreover, the term "molecular weight" should be understood to mean equivalent weight, which is defined as molecular weight per sulfonate group. The term "molecular weight" is used because it is commonly applied by manufacturers of petroleum sulfonates in describing their products.

The surfactant, as mentioned above, may be employed in a hydrocarbon solvent. Suitable hydrocarbon solvents are hydrocarbons which are liquid at the temperature and pressure of the subterranean formation. Suitable hydrocarbons include crude oil, gas oil, kerosine, gasoline, distillate, and liquefied petroleum gases.

The surfactant may be employed in hydrocarbon solution followed by surfactant in aqueous solution.

Regarding the quantity of sacrificial inorganic additive to be employed, any quantity will assist in reducing adsorption of the surfactant from the surfactant solution. The greater the quantity of sacrificial inorganic additive adsorbed, up to the amount sufficient to saturate, i.e., cover all, the adsorption sites of the subterranean formation, the greater will be the reduction in the adsorption of surfactant from the surfactant solution. Therefore, the solution of sacrificial inorganic additive should contain a sufficient quantity of sacrificial inorganic additive to cover a large number of the adsorption sites of the subterranean formation in order to reduce appreciably the amount of surfactant which will adsorp onto the surfaces the subterranean formation. Preferably, the solution of sacrificial inorganic additive should contain a sufficient quantity of sacrificial inorganic additive to cover the majority of the adsorption sites. It is particularly preferred that the solution contain a sufficient quantity of sacrificial inorganic additive to saturate the adsorption sites of the subterranean formation.

Ordinarily, the quantity of sacrificial inorganic additive is expressed in pounds in additive per acre foot of formation in the pattern which is sought to be swept by the flooding water. A quantity of sacrificial inorganic additive of at least about 400 pounds per acre foot is required. Where the formation is such, because of stratification or otherwise, that the invasion efficiency is less than 100 percent of the pattern sought to be swept by the flooding water, the quantity of the sacrificial inorganic additive is reduced proportionately. Thus, if the invasion efficiency in any formation is 30 percent, i.e., the flooding water will invade only 30 percent of the volume of the formation in the pattern of flow of the flooding water between the injection means and the production means, the quantity of sacrificial inorganic additive will be at least about 120 pounds per acre foot of the total volume of the subterranean formation. Ordinarily, a total amount of sacrificial inorganic additive of from about 1200 to about 4000 pounds per acre foot is adequate to saturate the adsorption sites of the subterranean formation. Where the formation is dirty, the larger amounts up to about 4000 pounds per acre foot of sacrificial inorganic additive are employed.

Where both sodium carbonate and a wetting agent are employed as sacrificial inorganic additives, the proportion of each may vary but the total, ordinarily, will still be within the foregoing guidelines. The proportion of each, ordinarily, may be about equal. The proportion of each may shift, however, depending on the composition of the subterranean formation. For example, in a relatively clean sandstone, the total concentration will be predominantly sodium carbonate and only a minor portion, e.g., about 10 percent, will be wetting agent. Conversely, in dirty formations, a major portion of the sacrificial inorganic additives may be wetting agent.

A convenient empirical expression for the quantity of sacrificial inorganic additive to be employed is the product of the fraction of the pore volume of the sacrificial inorganic additive solution and the concentration in percent by weight of the sacrificial inorganic additive. A given prouct of volume and concentration is equivalent, at a given invasion efficiency, to a given amount in pounds per acre foot. Usually, at least 0.05 (pore volume) (percent by weight), which is roughly equivalent to about 400 pounds per acre foot, of sacrificial inorganic additive is employed. Ordinarily, an amount of sacrificial inorganic additive affording from about 0.15 to about 0.5 (pore volume) (percent by weight) is adequate. For example, a solution comprising 1 pore volume of flooding water containing a total of from about 0.15 to about 0.5 percent by weight of sacrificial inorganic additive is adequate. Preferably, the quantity of solution employed will be from about 0.01 to about 0.2 pore volume and the concentration correspondingly higher in order to prevent undue delay in injecting the desired quantity of sacrificial inorganic additive and, ultimately, in increasing the recovery of oil from the subterranean formation.

Ordinarily, when sodium carbonate is employed as a sacrificial inorganic additive, 0.1 pore volume of solution of sacrificial inorganic additive containing from about 1 to about 3 percent by weight of sodium carbonate will cover the majority of the adsorption sites of a subterranean formation to be flooded. This will be a (volume) (concentration) product of from about 0.1 to about 0.3. Infrequently, special subterranean formations may require more or less sodium carbonate. For example, since the adsorption sites are predominantly on the edges of clay particles, clean sandstone formations with very little clays may require concentrations of less than 1 percent sodium carbonate in 0.1 pore volume of solution. Conversely, dirty formations may require a concentration above 3 percent in the 0.1 pore volume of solution. Larger volumes containing lower concentrations of sodium carbonate may be employed. Conversely, smaller volumes containing higher concentrations of sodium carbonate may be employed.

When a wetting agent is employed as a sacrificial inorganic additive, 0.1 pore volume of solution of sacrificial inorganic additive containing about 0.5 to about 2 percent by weight of the wetting agent will cover the majority of the adsorption sites of the formation to be flooded. This will be a (volume) (concentration) product of from about 0.05 to about 0.2. Similarly as described in connection with the sodium carbonate, clean sandstone formations may require less wetting agent than the 0.5 percent by weight in the 0.1 pore volume of flooding water. Conversely, dirty formations may require a larger amount of wetting agent than 2 percent by weight in 0.1 pore volume of flooding water. Larger volumes containing lower concentrations of wetting agent may be employed. Conversely, smaller volumes containing higher concentrations of wetting agent may be employed.

A preferred solution of sacrificial inorganic additive comprises a slug of about 0.1 pore volume of flooding water containing from about 1 to about 3 percent by weight sodium carbonate and containing from about 0.5 to about 2 percent by weight of wetting agent.

From an engineering point of view, it is often desirable to tailor the amount of sacrificial inorganic additives to the particular formation to be flooded. This process involves sampling the subterranean formation and determining the adsorption site demands of the subterranean formation from empirical observations carried out on these samples. This embodiment is described in more detail and illustrated with specific chemicals after the following discussion of materials and steps employed in the practice of the invention.

When the solution of sacrificial inorganic additive contains a concentration of the sacrificial inorganic additive above about 0.5 percent by weight, as it ordinarily will, an aqueous buffer liquid is employed between the solution of sacrificial inorganic additive and the surfactant solution. The buffer liquid should contain a lower concentration of the sacrificial inorganic additive to lessen the tendency of the surfactants to adsorb, as explained in more detail hereinafter, and to establish a chemically compatible environment that enhances the interfacial activity of the surfactant in the surfactant solution. The buffer liquid should contain a concentration of from about 0.01 to about 0.5 percent by weight of the sacrificial inorganic additive. Preferably, the buffer liquid will contain from about 0.05 to about 0.2 percent by weight of the sacrificial inorganic additive. The slug or buffer liquid will ordinarily comprise from about 0.01 to about 0.1 pore volume.

The surfactant solution should contain a concentration of surfactant of from about 0.01 to about 25 percent by weight. Even higher concentrations of surfactant sometimes improve the recovery of oil. However, the higher concentrations are more expensive and are not generally economically feasible.

When the surfactant solution is an aqueous solution, it is preferred that the aqueous surfactant solution also contain from about 0.05 to about 0.2 percent by weight of sacrificial inorganic additive to compete for the adsorption sites and reduce the adsorption losses of the surfactant from the surfactant solution.

The slug of surfactant solution will ordinarily comprise from about 0.01 to about 0.2 pore volume. Larger volumes of surfactant solution enable recovering slightly greater quantities of oil but may not be economically feasible since cost of the surfactant solution may exceed the value of the additional oil recovered. After the solution of sacrificial inorganic additive and the surfactant solution have been injected into the formation, flooding water is then injected to drive the previously injected solutions and the displaced oil toward the production means. Preferably, the flooding water following immediately behind the surfactant solution contains from about 0.05 to about 0.2 percent by weight of sacrificial inorganic additives to compete for the adsorption sites and help desorb any surfactant which has been adsorbed onto the subterranean formation. Ordinarily, the sacrificial inorganic additives need be included in no more than about the first 0.1 pore volume of flooding water following behind the surfactant solution.

The injection sequence of solution of sacrificial inorganic additive, buffer liquid, where employed, surfactant solution, and flooding water is spoken of as a complete cycle. Infrequently, it may be desirable to employ an additional one or more cycles in effecting a satisfactory recovery of the oil from a subterranean formation.

Often subterranean formations contains brines having a high concentration of sodium chloride, for example, about 4 percent, or higher, by weight of sodium chloride. Often, the flooding water available in the area of such formations will be composed of these concentrated brines. These brines may also contain appreciable concentration of divalent cations, principally calcium and magnesium ions. The sacrificial inorganic additives and the restricted petroleum sulfonates are chemically incompatible with brines containing appreciable concentration of divalent cations. Further, the restricted petroleum sulfonates are chemically incompatible with brines having sodium chloride concentrations in excess of about 2 percent by weight.

To prevent any adverse reactions between either the solution of sacrificial inorganic additive or the surfactant solution and such concentrated brines within a subterranean formation, a slug of about 0.01 to about 0.05 pore volume of less-saline flooding water, i.e., flooding water containing less than 2 percent by weight sodium chloride and containing essentially no divalent cations, is injected through the injection means and into the subterranean formation ahead of the solution of sacrificial inorganic additive. The less-saline flooding water miscibly displaces the concentrated brine, leaving an environment with which the solution of sacrificial inorganic additive is chemically compatible. Further, it leaves an environment with which the surfactant solution is chemically compatible.

Where the flooding water which is to be injected behind the surfactant solution is such a concentrated brine, a posterior slug of from about 0.01 to about 0.05 pore volume of the less-saline flooding water should be injected through the injection means and into the subterranean formation behind the surfactant solution and in front of the flooding water. Again, such a slug of less-saline flooding water prevents the concentrated brine comprising the flooding water from intermingling with and producing adverse chemical reactions with the surfactant solution. The posterior slug of less-saline flooding water, when employed, preferably will contain from about 0.05 to about 0.2 percent by weight of sacrificial inorganic additive.

As indicated hereinbefore, from an engineering point of view, it is desirable to determine the demand of the adsorption sites of the particular subterranean formation to be flooded and to incorporate enough sacrificial inorganic additive in the solution to cover substantially all the adsorption sites. The demand of the adsorption sites for the additive can be determined by testing samples of the subterranean formation. Any samples of the subterranean formation may be employed. The testing may be in situ or on samples brought to the surface. These samples are usually obtained as core samples when the well is being drilled or following the completion of the well. For that reason, the samples of the subterranean formation will be referred to herein as core samples. Desirably, the core samples are tested in their aggregated state. Sometimes it is necessary to employ a disaggregated sample of the subterranean formation.

A static system may be employed to determine the adsorption site demands. In the static system, a sample of the subterranean formation is submerged in a solution of the additive in a given concentration. The adsorption site demand for a given volume of the sample of the subterranean formation is determined by one of two procedures. In the first, the amount of the additive which is added to maintain a given concentration of the additive in the solution surrounding the sample is measured as the determination of the adsorption site demand at the given concentration. In the second, the depletion of the additive from the solution, as indicated by the decreasing concentration of the additive in the solution, is used as the determination of the adsorption site demand at the final equilibrium concentration.

Alternatively, a dynamic system may be employed to determine the adsorption site demands. In the dynamic system, a solution of the additive in a given concentration is flowed through a properly mounted core sample of the subterranean formation. The core sample is contained in a rubber-sleeved cell and a sleeve pressure applied to prevent flow of flooding liquid around the core sample. The concentration of the additive in the effluent is measured and flow is continue until the effluent concentration is essentially the same as the inlet concentration. The amount of the additive required to saturate the sample of the subterranean formation is determined by integrating the difference between the inlet concentrations and the effluent concentrations over the particular volume which has been flowed through the core sample.

Ordinarily, sodium carbonate will be employed as the sacrificial inorganic additive, as mentioned previously, or at least as one of the constituents thereof because of its economy. Where the sodium carbonate is to be employed, the adsorption site demands of the formation are determined initially with respect to sodium carbonate alone. Such a determination is made employing a solution having a concentration from about 0.01 to about 1 percent by weight of sodium carbonate. The quantity of sodium carbonate absorbed is determined by one of the static systems or by the dynamic system previously described. The volume of the core sample is known. Thus, the quantity of sodium carbonate adsorbed per unit volume of the subterranean formation is the adsorption site demand per unit volume for the subterranean formation from which the core sample was obtained.

Also as mentioned previously, wetting agent alone may be employed as the sacrificial inorganic additive. Where a wetting agent is to be employed, the adsorption site demands of the formation are determined with respect to the wetting agent alone. Such determination is made employing a solution having a concentration of from about 0.05 to about 0.15 percent by weight of the wetting agent. The quantity of wetting agent adsorbed is determined by one of the static systems or by the dynamic system previously described. The volume of the core sample is known. Thus, the quantity of wetting agent adsorbed per unit volume of the subterranean formation is the adsorption site demand per unit volume for the subterranean formation from which the core sample was obtained.

In cases where a wetting agent is to be employed in addition to the sodium carbonate, the adsorption site demand for the sodium carbonate is first determined and then the adsorption site demand for the wetting agent is determined in the presence of the sodium carbonate. The determinations are made using the same procedure and employing the same concentrations described for the separate determinations.

It is not essential that the amount of sacrificial inorganic additive required to satisfy the adsorption site demands, as determined above, be employed. Rather, a lesser amount may be employed. For any amount employed, there will be a proportionate reduction in the loss of surfactant by adsorption into the formation. The amount of sacrificial inorganic additive employed should be at least 75 percent of the amount required to satisfy the adsorption site demands as determined above. Preferably, the amount employed should be that as determined above.

Equipment which is ordinarily employed in waterflooding a subterranean formation to recover oil therefrom may be employed in mixing and injecting the solutions in the practice of the invention. Likewise, the production equipment which is ordinarily employed to handle produced fluids in an oil field may be employed in handling the oil and other fluids produced through the production means.

Figure 1A:
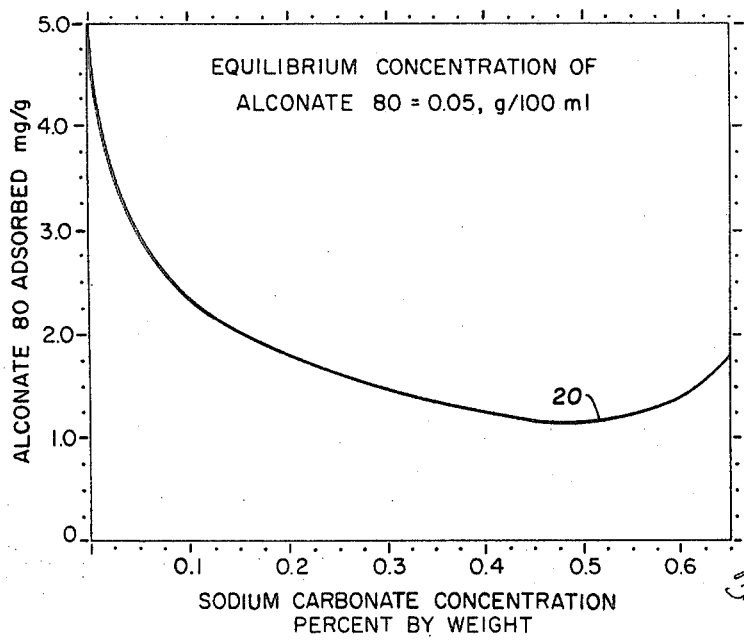
Figure 1B:
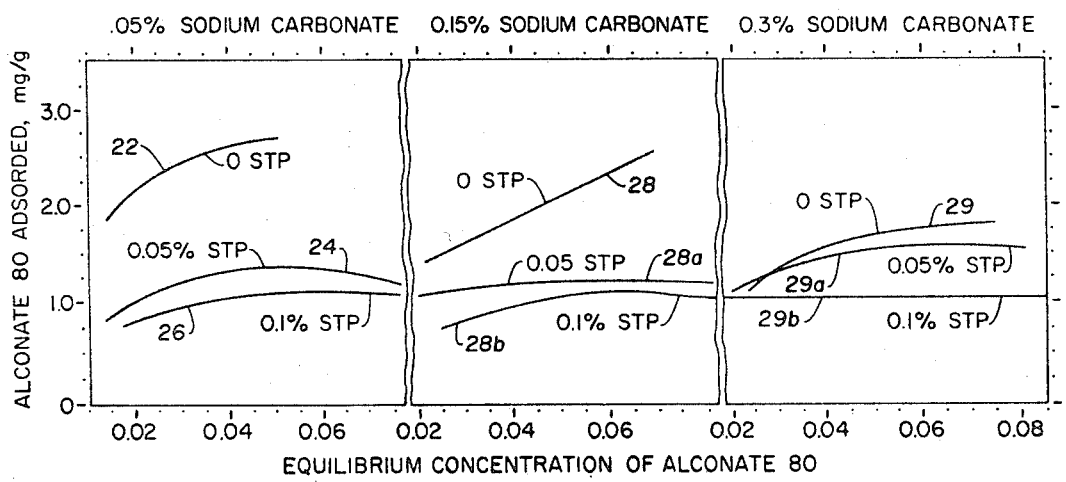

The efficacy of the sacrificial inorganic additive in reducing the adsorption of surfactants is illustrated in FIGURES 1, 1a, and 1b. FIGURE 1 depicts the adsorption isotherms of Alconate 80 from an oil field brine onto a disaggregated core sample at 25° C. Alconate 80 is a commercial mixture of petroleum sulfonates having an median molecular weight of about 418, and having molecular weights as high as 590. The core sample was primarily sandstone and was taken from the Upper Upper Loma Novia Sand, Loma Novia Field, Duval County, Tex. The brine was the native water, called Loma Novia brine, produced from the field. The brine contained about 1.2 percent by weight sodium chloride and a minor amount of other dissolved solids. The uppermost curve 11 shows the amount of Alcanate 80, in milligrams per gram of core sample (mg./gm.), adsorbed from the brine used to prepare the surfactant solution plotted against equilibrium concentration of surfactant in grams per 100 milliliters thereof (gm./100 ml.). Equilibrium concentration, as is well known, simply connotes that steady state conditions exist, equal numbers of molecules being adsorbed and desorbed. The lower curves illustrate the reduced amounts adsorbed when various other amounts of the sodium carbonate were added to the brine. Curve 12 illustrates the amount of surfactant adsorbed when 0.05 percent by weight sodium carbonate was included in the brine. Curve 13 illustrates the amount of surfactant adsorbed when 0.15 percent by weight sodium carbonate was added to the brine. Similarly, curve 14 illustrates the amount of surfactant adsorbed when 0.30 percent by weight sodium carbonate was added to the brine. Curve 16 illustrates the even lower amount adsorbed when the concentration of sodium carbonate was increased to 0.45 percent by weight. On the other hand, curve 18 illustrates that, with still higher concentrations of sodium carbonate, i.e., 0.60 percent, adsorption of the Alconate 80 begins to increase.

As illustrated in FIGURE 1a, there is an optimum concentration of sacrificial inorganic additive. At concentrations higher and lower than this optimum concentration, the adsorption of surfactant is increased. FIGURE 1a depicts the adsorption of Alconate 80 from the Loma Novia brine containing an equilibrium concentration of 0.05 percent by weight of Alconate 80 as a function of sodium carbonate concentration. As shown by curve 20, the optimum concentration of sodium carbonate is about 0.5 percent by weight.

FIGURE 1b illustrates the effect of adding sodium tripolyphosphate to different concentrations of sodium carbonate in reducing the amount of Alconate 80 adsorbed from the Loma Novia brine onto the same type of core sample described hereinbefore. When the surfactant solution contained 0.05 percent by weight sodium carbonate, curve 22 illustrates the adsorption of Alconate 80 with no sodium tripolyphosphate (STP). In contrast, curve 24 shows the reduction of Alconate 80 adsorbed by including 0.05 percent sodium tripolyphosphate. Note that curve 24 shows amounts of surfactant adsorbed of less than half that adsorbed with no sodium tripolyphosphate, curve 22. Curve 26 illustrates a further reduction in the amount of surfactant adsorbed by further increasing the concentration of sodium tripolyphosphate to 0.1 percent. The amount of reduction of surfactant adsorbed was diminished by the further increase in sodium tripolyphosphate concentration. The second and third families of curves 28, 28a, and 28b and 29, 29a, and 29b show the same direction of change in the amount of Alconate 80 adsorbed in the presence of higher concentrations of sodium carbonate. As the concentration of sodium carbonate is increased, more of the adsorption sites are initially covered, and hence the effectiveness of adding the first low concentration of wetting agent is reduced.

Figure 2:
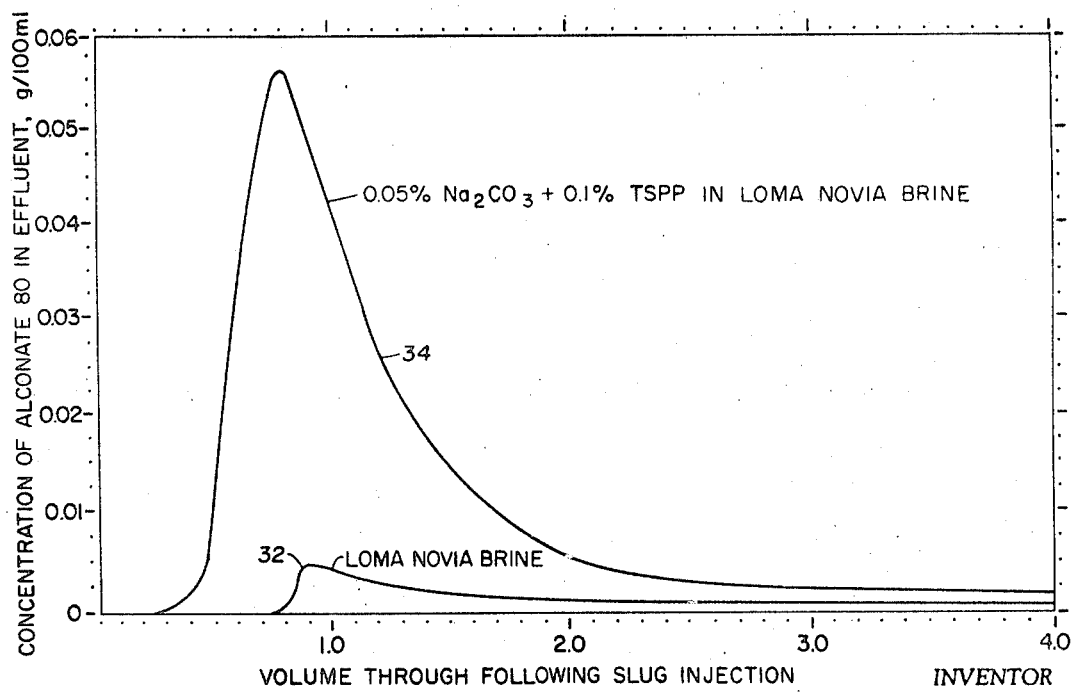
FIGURE 2 is a graph showing the improved transport through a permeable medium of surfactant in flooding water containing sacrificial inorganic additives.

The improved transport of the surfactants in a slug flowed through porous media by employing sacrificial inorganic additives is illustrated in FIGURE 2. In FIGURE 2, the concentration of Alconate 80 in the effluent stream is plotted as a function of volume of water flowed through the core sample after the surfactant solution. To obtain the data illustrated in FIGURE 2, a lucite tube one inch in diameter by 14 inches in length was packed with a similar disaggregated sandstone sample described hereinbefore but with a lower surface area. The porous pack which resulted contained a bulk volume of sandstone of 143 cubic centimeters and a pore space of 60 cubic centimeters, affording a porosity of 41 percent. The pack was saturated with the Loma Novia brine. Six milliliters, or 0.1 pore volume, of the Loma Novia brine containing 1.0 percent Alconate 80, as a surfactant solution, were injected and displaced with the Loma Novia brine. Curve 32 shows the concentration of surfactant in the effluent during the first run. A second and duplicate run was made except that prior to injecting the surfactant solution, 0.33 pore volume of the brine containing 0.05 percent by weight sodium carbonate plus 0.1 percent by weight tetrasodium pyrophosphate (TSPP) was injected. In the second run, the slug was displaced with water containing 0.1 percent by weight tetrasodium pyrophosphate. Curve 34 shows the effluent concentration for the second run. A total of 20 pore volumes of brine was flooded through the pack without significant recovery of surfactant other than that shown in FIGURE 2. In the absence of the sacrificial inorganic additives, curve 32, the peak surfactant concentration in the effluent was 0.0043 percent by weight and only 5.02 percent of the injected surfactant was recovered from the pack after flushing with 4 pore volumes. On the other hand, the peak effluent concentration in the flood containing the sacrificial inorganic additives, curve 34, was 0.056 percent and 42 percent of the surfactant injected was recovered after 4 pore volumes of brine had been flowed through the pack.

What is claimed is:

1. In a method of recovering oil from an oil-containing subterranean formation having an injection well and a production well completed therein, the steps which comprise:

(a) injecting through said injection well and into said subterranean formation an aqueous solution of an inorganic polyphosphate as a sacrificial inorganic additive containing enough of said inorganic polyphosphate to cover a majority of the adsorption sites of said subterranean formation, (b) injecting through said injection well and into said subterranean formation a surfactant solution, and (c) injecting through said injection well and into said subterranean formation flooding water.

2. The method of claim 1 wherein an amount of said inorganic polyphosphate of at least 400 pounds per acre foot of a pattern from which oil is to be recovered within said subterranean formation is injected.

3. The method of claim 2 wherein an amount of from about 1200 to about 4000 pounds per acre foot of said pattern in said subterranean formation of said inorganic polyphosphate is injected.

4. The method of claim 1 wherein said solution of inorganic polyphosphate is injected in a volume and contains a concentration of said inorganic polyphosphate sufficient to afford at least 0.05 (pore volume) (percent by weight).

5. The method of claim 1 wherein said solution of inorganic polyphosphate is injected in a volume and contains a concentration of said inorganic polyphosphate sufficient to afford from about 0.15 to about 0.5 (pore volume) (percent by weight).

6. The method of claim 1 wherein said inorganic polyphosphate is sodium tripolyphosphate or tetrasodium pyrophosphate.

7. The method of claim 1 wherein said solution of sacrificial inorganic additive is injected in the amount of about 0.1 pore volume and contains from about 1 to about 3 percent by weight of sodium carbonate and from about 0.5 to about 2 percent by weight of wetting agent.

8. The method of claim 1 wherein from 0.01 to 0.1 pore volume of an aqueous buffer liquid containing from about 0.01 to about 0.5 percent by weight of said inorganic polyphosphate is injected through said injection well and into said subterranean formation behind said aqueous solution of inorganic polyphosphate and before said surfactant solution.

9. The method of claim 1 wherein said surfactant solution contains a concentration of surfactant of from about 0.01 to about 25 percent by weight.

10. The method of claim 1 wherein said surfactant solution is a hydrocarbon solution of surfactant.

11. The method of claim 1 wherein said surfactant solution is an aqueous solution of surfactant.

12. The method of claim 11 wherein said aqueous surfactant solution contains from about 0.01 to about 0.5 percent by weight of said inorganic polyphosphate.

13. The method of claim 1 wherein said surfactant solution comprises a hydrocarbon solution of surfactant followed by an aqueous solution of surfactant.

14. The method of claim 1 wherein the first 0.1 pore volume of flooding water injected immediately behind said surfactant solution contains from about 0.01 to about 0.5 percent by weight of inorganic polyphosphate.

15. The method of claim 1 wherein an amount of about 0.01 to about 0.2 pore volume of less-saline flooding water containing less than 2 percent by weight of sodium chloride and essentially no divalent cations is injected through said injection well and into said subterranean formation ahead of said solution of inorganic polyphosphate.

16. The method of claim 15 wherein said less-saline flooding water is injected in an amount of about 0.1 pore volume.

17. The method of claim 1 wherein an amount of about 0.01 to about 0.2 pore volume of less-saline flooding water containing less than 2 percent by weight of sodium chloride and essentially no divalent cations is injected through said injection well and into said subterranean formation behind said surfactant solution and in front of said flooding water.

18. The method of claim 17 wherein said less-saline flooding water is injected in an amount of about 0.1 pore volume.

19. The method of claim 1 wherein said solution of inorganic polyphosphate also contains a soluble carbonate.

20. The method of claim 1 wherein said solution of inorganic polyphosphate is injected in the amount of about 0.1 pore volume and contains from about 0.5 to about 2 percent by weight of inorganic polyphosphate and also contains from about 1 to about 3 percent by weight of sodium carbonate.

21. The method of claim 1 wherein said solution of inorganic polyphosphate is injected in the amount of about 0.1 pore volume and contains from about 0.5 to about 2 percent by weight of said inorganic polyphosphate and contains from about 1 to about 3 percent by weight of sodium carbonate; and said surfactant solution contains a concentration of from about 0.01 to about 0.5 percent by weight sodium carbonate, of from about 0.05 to about 0.15 percent by weight of either inorganic polyphosphate or borax, and from about 0.01 to about 25 percent by weight of surfactant.

22. The method of claim 1 wherein said aqueous solution of inorganic polyphosate is injected in the amount, expressed in fraction of pore volume, and contains a concentration, expressed in percent by weight, (a) of inorganic polyphosphate which affords a (volume) (concentration) product of from about 0.05 to about 0.2, and (b) of sodium carbonate which affords a (volume) (concentration) product of from about 0.1 to about 0.3.

23. The method of recovering oil from an oil-containing subterranean formation having at least one injection well and at least one production well, comprising the steps of:
 (a) determining by adsorption tests on samples of the subterranean formation the adsorption site demands of said subterranean formation,
 (b) mixing an aqueous solution of an inorganic polyphosphate as a sacrificial inorganic additive containing at least 75 percent of enough inorganic polyphosphate to satisfy said adsorption site demands of said subterranean formation,
 (c) injecting said aqueous solution of inorganic polyphosphate through said injection well and into said subterranean formation,
 (d) injecting through said injection well and into said subterranean formation a surfactant solution,
 (e) injecting through said injection well into said subterranean formation flooding water to drive displaced oil toward said production well, and
 (f) producing oil from said subterranean formation through said production well to the surface of the earth.

24. The method of claim 23 wherein said aqueous solution of inorganic polyphosphate contains enough inorganic polyphosphate to satisfy said adsorption site demands of said subterranean formation.

25. In a method of recovering oil from an oil-containing subterranean formation having an injection well and a production well completed therein, the steps which comprise:
 (a) injecting through said injection well and into said subterranean formation an aqueous surfactant solution containing an inorganic polyphosphate as a sacrificial inorganic additive, said aqueous surfactant solution containing enough of said inorganic polyphosphate to cover a majority of the adsorption sites of said subterranean formation, and
 (b) injecting through said injection well and into said subterranean formation flooding water.

26. The method of claim 25 wherein said aqueous surfactant solution containing said inorganic polyphosphate also contains sodium carbonate.

27. The method of claim 25 wherein said aqueous surfactant solution containing said inorganic polyphosphate is an aqueous solution of a mixture of alkyl aryl sulfonates and said inorganic polyphosphate is sodium tripolyphosphate of tetrasodium pyrophosphate.

References Cited

UNITED STATES PATENTS

| | | | |
|---|---|---|---|
| 2,748,080 | 5/1956 | Newcombe et al. | 252—8.55 |
| 3,126,952 | 3/1964 | Jones | 166—9 |
| 3,191,676 | 6/1965 | Froning | 166—9 |
| 3,246,694 | 4/1966 | Taber et al. | 166—9 |
| 3,283,812 | 11/1966 | Ahearn et al. | 166—9 |
| 3,289,759 | 12/1966 | Fisher | 166—9 |
| 3,369,602 | 2/1968 | Fallgatter et al. | 166—9 |
| 3,371,710 | 3/1968 | Harvey et al. | 166—9 |

STEPHEN J. NOVOSAD, Primary Examiner

U.S. Cl. X.R.

166—273

PO-1050
(5/69)

UNITED STATES PATENT OFFICE
CERTIFICATE OF CORRECTION

Patent No. 3,469,630                    Dated September 30, 1969

Inventor(s) Billy G. Hurd and William R. Foster

It is certified that error appears in the above-identified patent and that said Letters Patent are hereby corrected as shown below:

Column 1, line 58, after "displacement" insert --efficiency--.
Column 2, line 13, "most" should read --cost--;
         line 21, "injection" should read --injecting--;
         line 45, "ab-" should read --ad- --;
         line 47, "absorption" should read --adsorption--;
         line 48, "absorption" should read --adsorption--;
         line 50, "absorbing" should read --adsorbing--;
         line 71, before "in solution" insert --from either a hydrocarbonaceous phase, an aqueous phase or both. For example, the surfactant may b injected into the formation--.
Column 4, line 24, "petoleum" should read --petroleum--;
         line 58, "adsorp" should read --adsorb--;
                  after "surfaces" insert --of--;
         line 67, "in" (second occurrence) should read --of--
Column 5, line 31, "prouct" should read --product--.
Column 6, line 38, after "slug", "or" should read --of--.
Column 7, line 3, "contains" should read --contain--.
Column 8, line 11, "continue" should read --continued--;
         line 27, "absorbed" should read --adsorbed--.
Column 9, line 14, "Alcanate" should read --Alconate--.
Column 10, lines 70 through 75, all of claim 7 should be deleted.
Column 11, line 65, "polyphosate" should read --polyphosphate--
Column 12, line 51, "of" should read --or--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents